United States Patent
Shao

(10) Patent No.: US 12,498,978 B2
(45) Date of Patent: Dec. 16, 2025

(54) METHODS, SYSTEMS, AND STORAGE MEDIA FOR COMPUTATION SCHEDULING BASED ON IIoT DATA CENTERS

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/206,035

(22) Filed: May 12, 2025

(65) Prior Publication Data
US 2025/0272151 A1    Aug. 28, 2025

(30) Foreign Application Priority Data

Apr. 14, 2025  (CN) .......................... 202510458682.9

(51) Int. Cl.
  *G06F 9/50*    (2006.01)
(52) U.S. Cl.
  CPC .................................. *G06F 9/5027* (2013.01)
(58) Field of Classification Search
  None
  See application file for complete search history.

(56) References Cited

U.S. PATENT DOCUMENTS 10,798,174 B2 * 10/2020 Shao ..................... H04L 67/562
11,169,495 B2 * 11/2021 Shah ..................... G06F 9/5072
(Continued)

FOREIGN PATENT DOCUMENTS

| CN | 112363821 A | 2/2021 |
|---|---|---|
| CN | 119105849 A | 12/2024 |

(Continued)

OTHER PUBLICATIONS

Dobaj et al.; "A Microservice Architecture for the Industrial Internet-Of-Things"; EuroPLoP '18, Jul. 4-8, 2018, Irsee, Germany; https://doi.org/10.1145/3282308.3282320; (Dobaj_2018.pdf) (Year: 2018).*

(Continued)

*Primary Examiner* — Hiren P Patel
(74) *Attorney, Agent, or Firm* — PORUS IP LLC

(57) ABSTRACT

Provided are a method, a system, and a storage medium for computation scheduling based on an IIoT data center. The system includes a management platform, the IIoT data center, and a plurality of data sub-platforms in communication with each other. The management platform is configured to. obtain operational features of the plurality of data sub-platforms; determine a first sub-platform and one or more second sub-platforms; determine at least one service to be split based on the operational features and service features corresponding to a plurality of services of the first sub-platform; split the at least one service to be split into a plurality of sub-services based on at least one service feature corresponding to the at least one service to be split; determine processing resource demands corresponding to the plurality of sub-services; and determine a service adjustment parameter based on the processing resource demands and the operational features.

9 Claims, 5 Drawing Sheets

(56) References Cited

U.S. PATENT DOCUMENTS

| | | | |
|---|---|---|---|
| 11,846,931 B2* | 12/2023 | Shao | G05B 19/4183 |
| 12,190,545 B2* | 1/2025 | Shao | G06T 7/0004 |
| 12,341,850 B2* | 6/2025 | Shao | H04L 67/12 |
| 2007/0094270 A1* | 4/2007 | Gallino | G06F 9/50 |
| 2010/0125847 A1* | 5/2010 | Hayashi | G06F 9/505 |
| | | | 718/102 |
| 2011/0041136 A1* | 2/2011 | Messier | G06F 9/5066 |
| | | | 718/105 |
| 2018/0198855 A1* | 7/2018 | Wang | G06F 9/5083 |
| 2018/0299873 A1* | 10/2018 | Chauvet | H04L 12/46 |
| 2019/0303207 A1* | 10/2019 | Vadapandeshwara | |
| | | | G06F 9/5038 |
| 2020/0272526 A1* | 8/2020 | Bhole | G06F 11/3409 |
| 2021/0319281 A1* | 10/2021 | Ji | H04L 67/10 |
| 2022/0179692 A1* | 6/2022 | Aronovich | G06F 9/4887 |
| 2023/0153088 A1* | 5/2023 | Wu | G06F 21/53 |
| | | | 717/140 |
| 2023/0283527 A1* | 9/2023 | Li | H04L 41/145 |
| | | | 370/252 |
| 2023/0333542 A1* | 10/2023 | Shao | G05B 19/41875 |
| 2024/0022954 A1* | 1/2024 | Chen | H04W 28/0278 |
| 2024/0111428 A1* | 4/2024 | Ling | G06F 3/0689 |
| 2024/0146663 A1* | 5/2024 | Cai | H04L 47/36 |

FOREIGN PATENT DOCUMENTS

| | | |
|---|---|---|
| CN | 119557067 A | 3/2025 |
| WO | 2023246330 A1 | 12/2023 |

OTHER PUBLICATIONS

Chekired et al.; "Industrial IoT Data Scheduling Based on Hierarchical Fog Computing: A Key for Enabling Smart Factory"; IEEE Transactions On Industrial Informatics, vol. 14, No. 10, Oct. 2018; (Chekired_2018.pdf) (Year: 2018).*

Wang et al.; "Online Task Scheduling and Resource Allocation for Intelligent NOMA-Based Industrial Internet of Things"; IEEE Journal On Selected Areas in Communications, vol. 38, No. 5, May 2020; (Wang_2020.pdf) (Year: 2020).*

Ruan, Yilong et al., Research and application of big data platform technology based on multi-centre collaborative computing, Telecommunications Science. 5: 141-151, 2024.

First Office Action in Chinese Application No. 202510458682.9 mailed on May 17, 2025, 11 pages.

* cited by examiner

500

Determining a plurality of candidate allocation relationships based on processing resource demands and operational features, and determining predicted operating information corresponding to the plurality of candidate allocation relationships  —510

Determining a target allocation relationship based on the predicted operating information  —520

Determining a service adjustment parameter based on the target allocation relationship  —530

FIG. 5

METHODS, SYSTEMS, AND STORAGE MEDIA FOR COMPUTATION SCHEDULING BASED ON IIoT DATA CENTERS

CROSS-REFERENCE TO RELATED APPLICATIONS

This application claims priority to Chinese Patent Application No. 202510458682.9, filed on Apr. 14, 2025, the entire contents of which are hereby incorporated by reference.

TECHNICAL FIELD

The present disclosure relates to the field of computation scheduling, and in particular relates to a system, a method, and a storage medium for computation scheduling based on an IIoT data center.

BACKGROUND

Each of data sub-platforms in an Industrial Internet of Things (IIoT) typically relies on a computing power of the data sub-platform to handle operations. However, different operations involve varying data volumes, and operations with different data volumes occupy different amounts of computing resources on the data sub-platforms. As a result, during the operation of the IIoT, some data sub-platforms may lack sufficient computing resources to meet operational demands, while others may have idle computing resources.

In view of this, it is necessary to provide a system, a method, and a storage medium for computation scheduling based on an IIoT data center. By splitting and scheduling operations across different data sub-platforms, the computing resources of each sub-platform can be fully utilized, balancing the computational load among the data sub-platforms.

SUMMARY

One or more embodiments provide a system for computation scheduling based on an Industrial Internet of Things (IIoT) data center. The system includes a management platform, the IIoT data center, and a plurality of data sub-platforms that are in communication with each other. The management platform is configured to: obtain operational features of the plurality of data sub-platforms; determine a first sub-platform and one or more second sub-platforms among the plurality of data sub-platforms based on the operational features; determine at least one service to be split based on the operational features and service features corresponding to a plurality of services of the first sub-platform; and split the at least one service to be split into a plurality of sub-services based on at least one service feature corresponding to the at least one service to be split. The management platform is further configured to: determine processing resource demands corresponding to the plurality of sub-services based on the at least one service feature corresponding to the at least one service to be split, the operational features, and sub-service features corresponding to the plurality of sub-services; determine a service adjustment parameter based on the processing resource demands and the operational features; and generate a service adjustment instruction based on the service adjustment parameter and send the service adjustment instruction to the first sub-platform and the one or more second sub-platforms. The first sub-platform is configured to: obtain a plurality of data packages by performing data processing on the plurality of sub-services based on the service adjustment instruction; and send the plurality of data packages to the second sub-platform. The one or more second sub-platforms are configured to: receive the plurality of data packages; determine data volumes of the plurality of data packages by parsing the plurality of data packages; obtain parsed data by allocating corresponding parsing memory for the plurality of data packages based on the data volumes and parsing the plurality of data packages; establish processes corresponding to the plurality of sub-services based on the parsed data; and determine processing resources for executing the processes based on the service adjustment instruction.

One or more embodiments provide a method for computation scheduling based on an Industrial Internet of Things (IIoT) data center. The method is executed by a management platform of a system for computation scheduling based on the IIoT data center. The system comprises the management platform, the IIoT data center, and a plurality of data sub-platforms that are in communication with each other. The method includes: obtaining operational features of the plurality of data sub-platforms; determining a first sub-platform and one or more second sub-platforms among the plurality of data sub-platforms based on the operational features; determining at least one service to be split based on the operational features and service features corresponding to a plurality of services of the first sub-platform; and splitting the at least one service to be split into a plurality of sub-services based on at least one service feature corresponding to the at least one service to be split. The method further includes: determining processing resource demands corresponding to the plurality of sub-services based on the at least one service feature corresponding to the at least one service to be split, the operational features, and sub-service features corresponding to the plurality of sub-services; determining a service adjustment parameter based on the processing resource demands and the operational features; and generating a service adjustment instruction based on the service adjustment parameter and sending the service adjustment instruction to the first sub-platform and the one or more second sub-platforms.

One or more embodiments provide a non-transitory computer-readable storage medium storing computer instructions. When reading the computer instructions in the storage medium, a computer implements the method for computation scheduling based on an Industrial Internet of Things (IIoT) data center described in the present disclosure.

BRIEF DESCRIPTION OF THE DRAWINGS

The present disclosure will be further illustrated by way of exemplary embodiments, which will be described in detail through the accompanying drawings. These embodiments are not limiting, and in these embodiments, the same numbering indicates the same structure, wherein:

FIG. 5 is a flowchart of an exemplary process for determining a service adjustment parameter according to some embodiments of the present disclosure.

DETAILED DESCRIPTION

Figure 1:
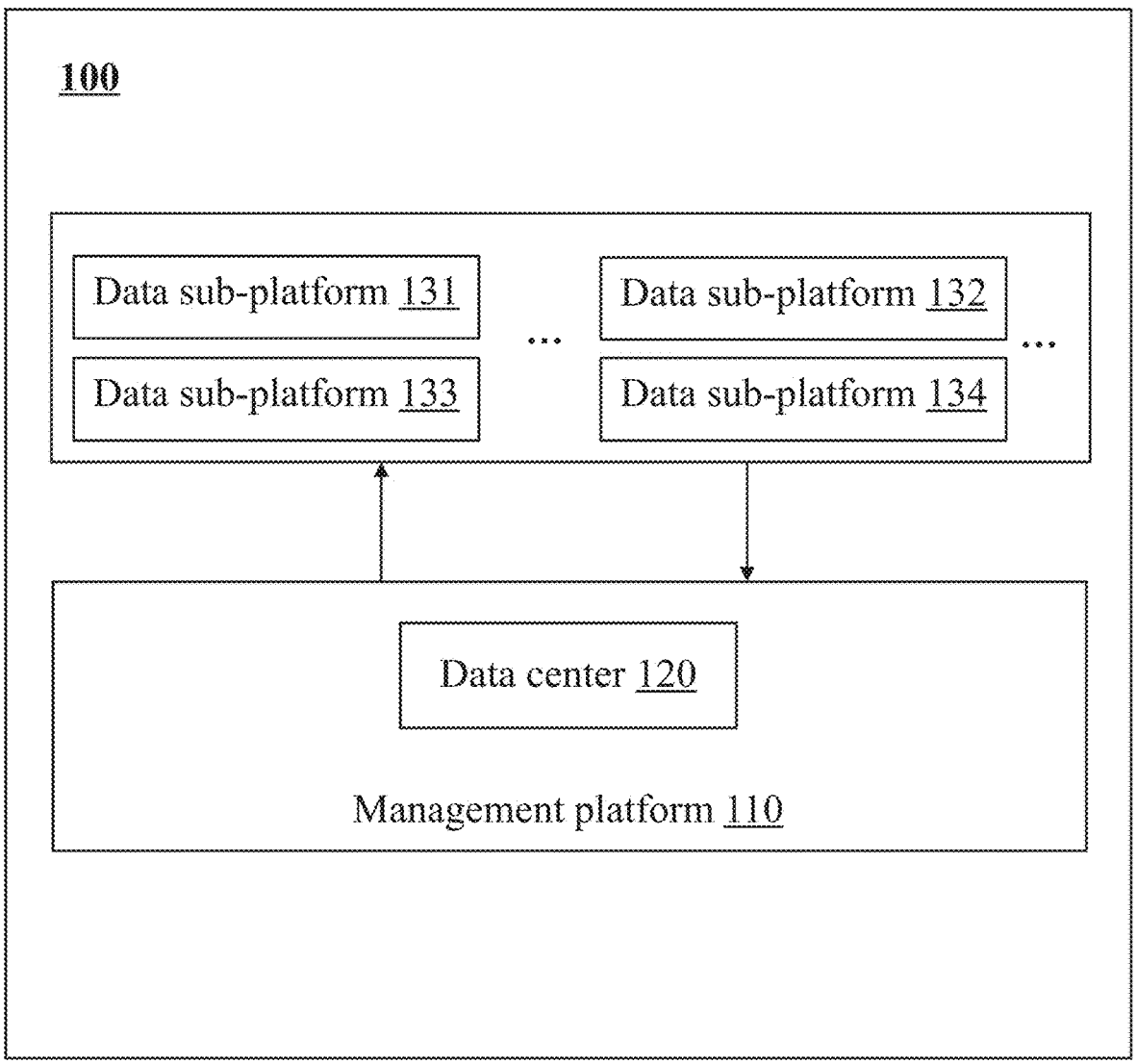
FIG. 1 is a block diagram of exemplary platforms of a system for computation scheduling based on an IIoT data center according to some embodiments of the present disclosure.

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system," "device," "unit," and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to some embodiments of the present disclosure. It should be understood that the operations described herein are not necessarily executed in a specific order. Instead, they may be executed in reverse order or simultaneously. Additionally, one or more other operations may be added to these processes, or one or more operations may be removed.

FIG. 1 is a block diagram of exemplary platforms of a system for computation scheduling based on an IIoT data center according to some embodiments of the present disclosure.

As shown in FIG. 1, a system 100 for computation scheduling based on an IIoT data (hereinafter referred to as the system 100) includes a management platform 110, an IIoT data center 120, and a plurality of data sub-platforms (e.g. a data sub-platform 131, a data sub-platform 132, a data sub-platform 133, and a data sub-platform 134, etc.). The management platform 110, the data center 120, and the plurality of data sub-platforms are in communication with each other. The IIoT data center is also referred to as the data center.

The management platform is a platform that processes at least one of information and instructions related to the system 100. In some embodiments, the management platform is configured on a server, a processor, or the like.

In some embodiments, the processor includes a central processing unit (CPU), an application-specific integrated circuit (ASIC), an application-specific instruction processor (ASIP), etc., or any combination thereof.

In some embodiments, the management platform includes the data center 120.

The data center is configured to store and manage the at least one of information and instructions related to the system 100. The data center is configured as a storage device, or the like.

The data sub-platforms are platforms that are configured to accomplish services. Different data sub-platforms are configured to accomplish a plurality of different services. A service refers to computational or analytical processing of data. For example, the service includes preprocessing the data or analyzing a product quality of each product in product data. The preprocessing includes cleansing, normalizing, or the like.

In some embodiments, the data sub-platforms obtain a variety of data which is required to process the services from the data center. For example, the variety of data includes data items to be processed, or the like.

The plurality of data sub-platforms may be in communication with each other. In some embodiments, the data sub-platforms are configured on the server, the processor, or the like.

More detailed descriptions of the foregoing may be found in FIGS. 2-5 and related descriptions thereof.

Based on the system 100, services of different data sub-platforms can be split, and service coordination between the data sub-platforms can be achieved.

Figure 2:
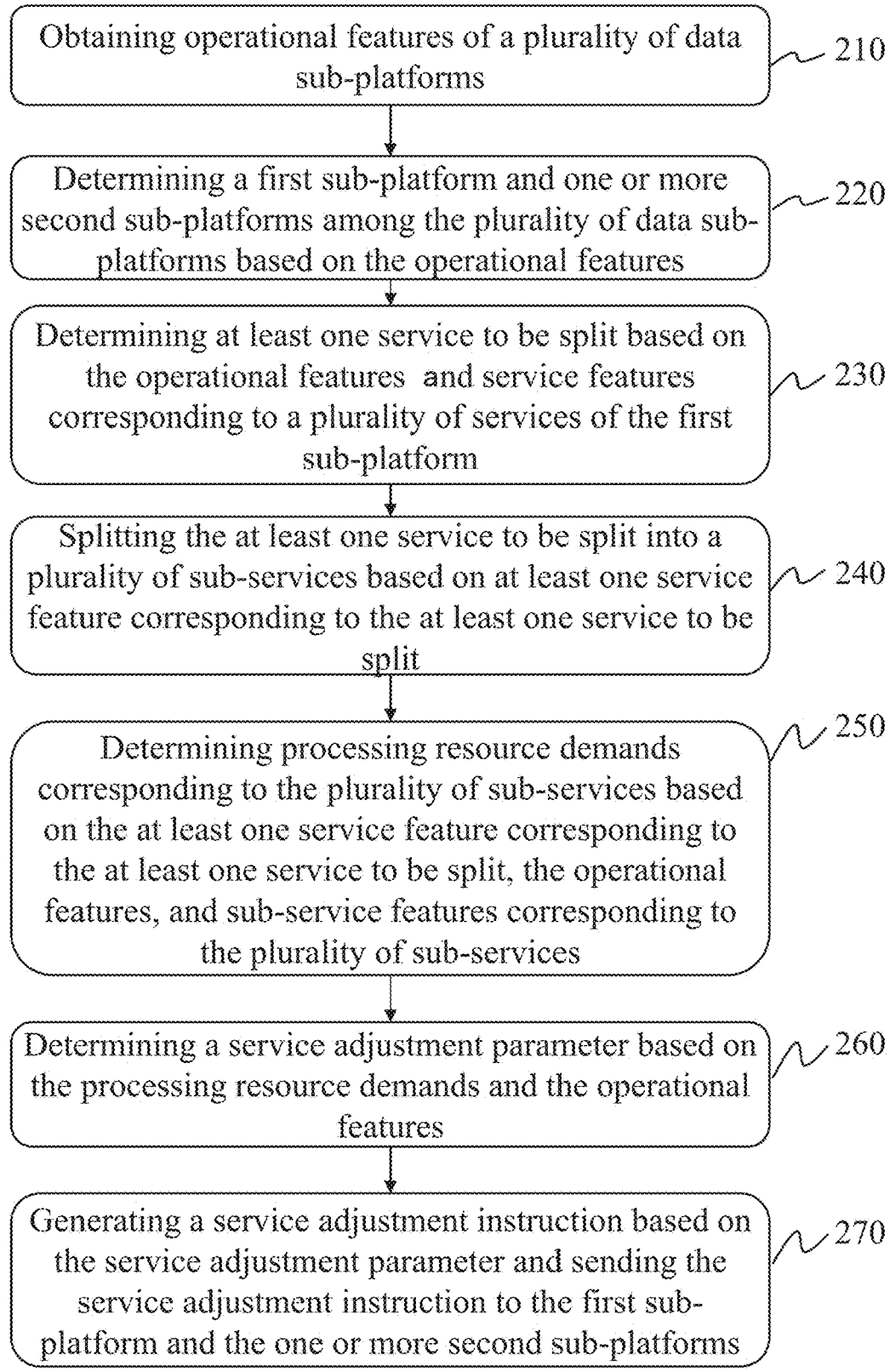
FIG. 2 is a flowchart of an exemplary process of a method for computation scheduling based on an IIoT data center according to some embodiments of the present disclosure.

FIG. 2 is a flowchart of an exemplary process of a method for computation scheduling based on an IIoT data center according to some embodiments of the present disclosure. As shown in FIG. 2, process 200 includes the following operations. In some embodiments, process 200 is implemented by a management platform (e.g., the management platform 110) of the system 100.

More descriptions of the system for computation scheduling based on the Industrial Internet of Things (IIoT) data center and the platforms of the system may be found in FIG. 1 and the related descriptions thereof.

Operation 210: obtaining operational features of a plurality of data sub-platforms.

Each data sub-platform corresponds to an operational feature. The operational feature of a data sub-platform refers to data related to an operation of the data sub-platform.

In some embodiments, the operational feature of a data sub-platform includes a total CPU usage rate and a total memory occupancy rate of the data sub-platform, as well as a CPU usage rate and a memory occupancy rate corresponding to each service on the data sub-platform.

In some embodiments, the management platform acquires a process runtime table from a data sub-platform to obtain the operational feature of the data sub-platform.

The process runtime table refers to a data table automatically generated during service processing on the data sub-platform, displaying a processing resource consumed by each service. The processing resource includes a CPU resource, a memory resource, etc.

Operation 220: determining a first sub-platform and one or more second sub-platforms among the plurality of data sub-platforms based on the operational features.

The first sub-platform refers to a data sub-platform that requires offloading service to other sub-platforms.

The one or more second sub-platforms refer to all other data sub-platforms among the plurality of data sub-platforms excluding the first sub-platform.

In some embodiments, the management platform may designate a data sub-platform that meets a preset screening condition as the first sub-platform, and remaining sub-platforms are classified as the one or more second sub-platforms. The preset screening condition may include at least one of the total CPU usage rate and the total memory occupancy rate of the sub-platform exceeding a preset threshold. The preset threshold may be determined based on historical experience. The preset screening condition may also include the sub-platform having a highest CPU usage rate among all data sub-platforms.

Operation 230: determining at least one service to be split based on the operational features and service features corresponding to a plurality of services of the first sub-platform.

Each service corresponds to a service feature. The service feature of a service refers to data reflecting information about the service. In some embodiments, the service feature of a service includes one or more functional items associated with the service and a count of data items corresponding to each functional item.

A functional item represents a function of the service. A service may include one or more functional items. The functional item may include preprocessing each data item, analyzing product quality of each product in product data, or the like. The preprocessing includes data cleaning, normalization, etc.

A data item refers to data corresponding to the execution of a functional item. For example, if the functional item is preprocessing each piece of data, the data items corresponding to the functional item are the individual pieces of data requiring preprocessing. One functional item corresponds to a plurality of data items.

A service to be split refers to a service in the first sub-platform that requires splitting.

In some embodiments, the management platform determines a splitting degree for each of a plurality of services based on the operational features and the service features of the plurality of services in the first sub-platform, ranks the splitting degrees, and identifies a service meeting a splitting degree condition as the service to be split. The splitting degree condition include ranking within top N positions in the splitting degree ranking. N is preset based on historical experience.

The splitting degree of a service refers to data characterizing an extent to which the service needs to be split. In some embodiments, the management platform determines the splitting degree of a service based on the service feature of the service and the operational features. For example, the management platform computes the splitting degree using an equation. For example, the equation may include Equation (1):

$$h = k1*G + k2*S + k3*C + k4*N \qquad (1)$$

In Equation (1), h represents the splitting degree, G denotes a count of functional items, S denotes a count of data items, C denotes the CPU usage rate of the service, and N denotes the memory occupancy rate of the service. k1 to k4 are preset coefficients, all greater than 0 and determined empirically.

Operation 240: splitting the at least one service to be split into a plurality of sub-services based on at least one service feature corresponding to the at least one service to be split.

A sub-service refers to a service obtained after splitting the service to be split.

In some embodiments, a count of sub-service after splitting is determined in various ways. For example, the count of sub-service may be equal to or less than a count of the plurality of data sub-platforms. Alternatively, the count of sub-service may be equal to a count of data sub-platforms meeting a preset condition. The preset condition includes the total CPU usage rate and the total memory occupancy rate being below corresponding occupancy thresholds. The occupancy thresholds are set empirically.

In some embodiments, the management platform splits the at least one service to be split into a plurality of sub-service in various ways based on the at least one service feature corresponding to the at least one service to be split. For example, the management platform splits each service to be split according to a preset rule to obtain a plurality of sub-service, and labels the each sub-service to distinguish the each sub-service from other sub-services.

In some embodiments, the preset rule includes splitting the service to be split based on different functional items, then further splitting the sub-services based on data items to obtain a required count of sub-services. Splitting based on data items includes splitting sub-service with a data item count greater than a preset splitting count into a plurality of sub-services, each of the plurality of sub-services with a data item count not greater than the preset splitting count. The preset splitting count is determined based on the count of sub-services. For example, the greater the count of sub-services is, the smaller the preset splitting count is.

By way of example, the count of sub-service is set to 3, and the preset splitting count is 10,000. If a service to be split includes two functional items, and one of the two functional items corresponds to 20,000 data items, the service is first split into two sub-service corresponding to the two functional items. The sub-service containing 20,000 data items is then further split into two sub-service, each with 10,000 data items, thus obtaining in a total of 3 sub-service.

In some embodiments, the management platform may split the service to be split according to a target splitting scheme to obtain corresponding sub-services. For further details, refer to FIG. 3 and its related descriptions.

Operation 250: determining processing resource demands corresponding to the plurality of sub-services based on the at least one service feature corresponding to the at least one service to be split, the operational features, and sub-service features corresponding to the plurality of sub-services.

The sub-service feature of a sub-service refers to the service feature corresponding to the sub-service. In some embodiments, the sub-service feature of a sub-service includes one or more functional items associated with the sub-service and a count of data items corresponding to each functional item, etc.

The processing resource demand corresponding to a sub-service refers to a computational resource needed to execute the sub-service. In some embodiments, the processing resource demand corresponding to a sub-service includes the CPU usage rate and the memory occupancy rate of the sub-service.

In some embodiments, the management platform determines the processing resource demands corresponding to the plurality of sub-services based on the at least one service feature corresponding to the at least one service to be split, the operational features, and the sub-service features corresponding to the plurality of sub-services. For example, for a sub-service, the management platform determines a ratio of a count of data items in the sub-service to a count of data items of the functional item(s) in the service to be split that corresponds to the sub-service. The ratio is then multiplied by the CPU usage rate and the memory occupancy rate in the operational feature to obtain a CPU usage rate and a memory occupancy rate corresponding to the sub-service.

Operation 260: determining a service adjustment parameter based on the processing resource demands and the operational features.

The service adjustment parameter refers to a parameter used for allocating the sub-services of the at least one service to be split to the one or more second sub-platforms. In some embodiments, the service adjustment parameter includes the sub-service feature and an allocation result corresponding to each of the plurality of sub-services.

The allocation result corresponding to a sub-service refers to the second sub-platform to which the sub-service needs to be allocated.

In some embodiments, the management platform determines the service adjustment parameter based on the processing resource demands and the operational features. For example, the management platform sequentially determines the allocation result for each of the sub-services from highest to lowest according to ranking positions of the sub-services in a first ranking result.

The first ranking result refers to a sorted sequence of sub-service arranged in descending order based on the processing resource demands corresponding to the sub-service. In some embodiments, for each of the sub-services, the management platform determines a first sum value by performing weighted summation on the sub-service's CPU usage rate and memory occupancy rate. The management platform then sorts all sub-services in descending order based on their corresponding first sum values to obtain the first ranking result.

In some embodiments, the management platform sequentially determines the allocation result for each of the sub-services from highest to lowest in the first ranking result by assigning the sub-services to data sub-platforms in descending order in a second ranking result. For example, the management platform allocates a first-ranked sub-service in the first ranking result to a first-ranked data sub-platform in a second ranking result. A second-ranked sub-service in the first ranking result is then allocated to the first-ranked data sub-platform in the second ranking result. If the first-ranked data sub-platform meets a preset allocation condition after the allocation, the first-ranked data sub-platform is determined as the allocation result for the second-ranked sub-service. If the first-ranked data sub-platform fails to meet the preset allocation condition after the allocation, the second-ranked sub-service is allocated to a second-ranked data sub-platform in the second ranking result. The management platform then continues to evaluate whether the second-ranked data sub-platform meets the preset allocation condition after the allocation. If the second-ranked data sub-platform meets the preset allocation condition, the allocation result for the second-ranked sub-service is determined as the second-ranked data sub-platform.

After the allocation result for the second-ranked sub-service is determined, the management platform proceeds to allocate a third-ranked sub-service in the first ranking result to the first-ranked data sub-platform in the second ranking result and repeats the above steps to determine the allocation result for the third-ranked sub-service. This process continues iteratively until the allocation results for all ranked sub-services are determined.

In some embodiments, the preset allocation condition includes: a sum of the CPU usage rate of the sub-service and the total CPU usage rate of the data sub-platform does not exceed a CPU allocation threshold of the data sub-platform, and a sum of the memory occupancy rate of the sub-service and the total memory occupancy rate of the data sub-platform does not exceed a memory allocation threshold of the data sub-platform. For example, the preset allocation conditions may specify that: the sum of the CPU usage rate of the second-ranked sub-service and a current total CPU usage rate (after allocating the first-ranked sub-service) of the first-ranked data sub-platform does not exceed the CPU allocation threshold, and the sum of the memory occupancy rate of the second-ranked sub-service and a current total memory occupancy rate (after allocating the first-ranked sub-service) of the first-ranked data sub-platform does not exceed the memory allocation threshold. The current total CPU usage rate/the current total memory occupancy rate of the first-ranked data sub-platform refers to the resource consumption of the first-ranked data sub-platform after accommodating the first-ranked sub-service. The CPU allocation threshold and the memory allocation threshold are set empirically.

The second ranking result refers to a sorted sequence of data sub-platforms arranged in ascending order based on their operational features. In some embodiments, for each data sub-platform, the management platform determines a second sum value through a weighted summation of the total CPU usage rate and the total memory occupancy rate of the sub-platform. All data sub-platforms are then sorted in ascending order based on their corresponding second sum values to obtain the second ranking result.

The operational feature of the first sub-platform participating in the sorting is determined by subtracting the CPU usage rate and the memory occupancy rate of the service to be split from an original total CPU usage rate and an original total memory occupancy rate of the first sub-platform.

In the aforementioned weighting process, weights assigned to data items are preset empirically and are all greater than 0.

In some embodiments, the management platform may determine the service adjustment parameter based on a target allocation relationship. More descriptions regarding the determination of the service adjustment parameter based on the target allocation relationship may be found in FIG. 5 and its related descriptions.

Operation 270: generating a service adjustment instruction based on the service adjustment parameter and sending the service adjustment instruction to the first sub-platform and the one or more second sub-platforms.

The service adjustment instruction refers to a command directing the first sub-platform to transfer each of the sub-services to the corresponding second sub-platform.

In some embodiments, the management platform converts the service adjustment parameter into a machine instruction, which is then transmitted to the first sub-platform and the second sub-platform respectively.

In some embodiments, after receiving the service adjustment instruction, the first sub-platform processes a plurality of sub-services according to the service adjustment instruction by performing data processing on the sub-services to generate a data package corresponding to each of the sub-services, then distributes data packages corresponding to the plurality of sub-service to the second sub-platform corresponding to the allocation result of each of the sub-services. The data processing includes data packaging.

In some embodiments, each data package includes operational program codes and configuration files corresponding to the functional items of the sub-service, to-be-processed data items, or the like.

In some embodiments, the management platform indicates a data volume of a data package by adding a length prefix to the data package. The second sub-platform receiving the data package may determine the data volume of the data package by parsing the length prefix, thereby allocating appropriate memory for the data package.

In some embodiments, after receiving the service adjustment instruction from the management platform and a plurality of data packages from the first sub-platform, the second sub-platform parses length prefixes of the data packages to determine data volumes of the data packages, and allocates corresponding parsing memory for the data packages based on the data volumes of the data packages. Then, the second sub-platform parses the data packages to obtain parsed data.

In some embodiments, the second sub-platform establishes processes corresponding to the plurality of sub-services based on the parsed data, and determines processing resources for executing the processes based on the service adjustment instruction.

The parsed data includes operational program codes for functional items, configuration files, to-be-processed data items, etc., corresponding to the sub-services.

In some embodiments, for each of the sub-services, the second sub-platform establish a process for the sub-service, randomly selects a required count of available processing cores from CPU resources of the second sub-platform, and binds the process to the selected core(s)

By splitting computationally intensive services from overloaded sub-platforms and redistributing them to under-utilized sub-platforms, this approach achieves more balanced utilization of computational resources across different sub-platforms, thereby significantly improving overall service processing efficiency.

Figure 3:
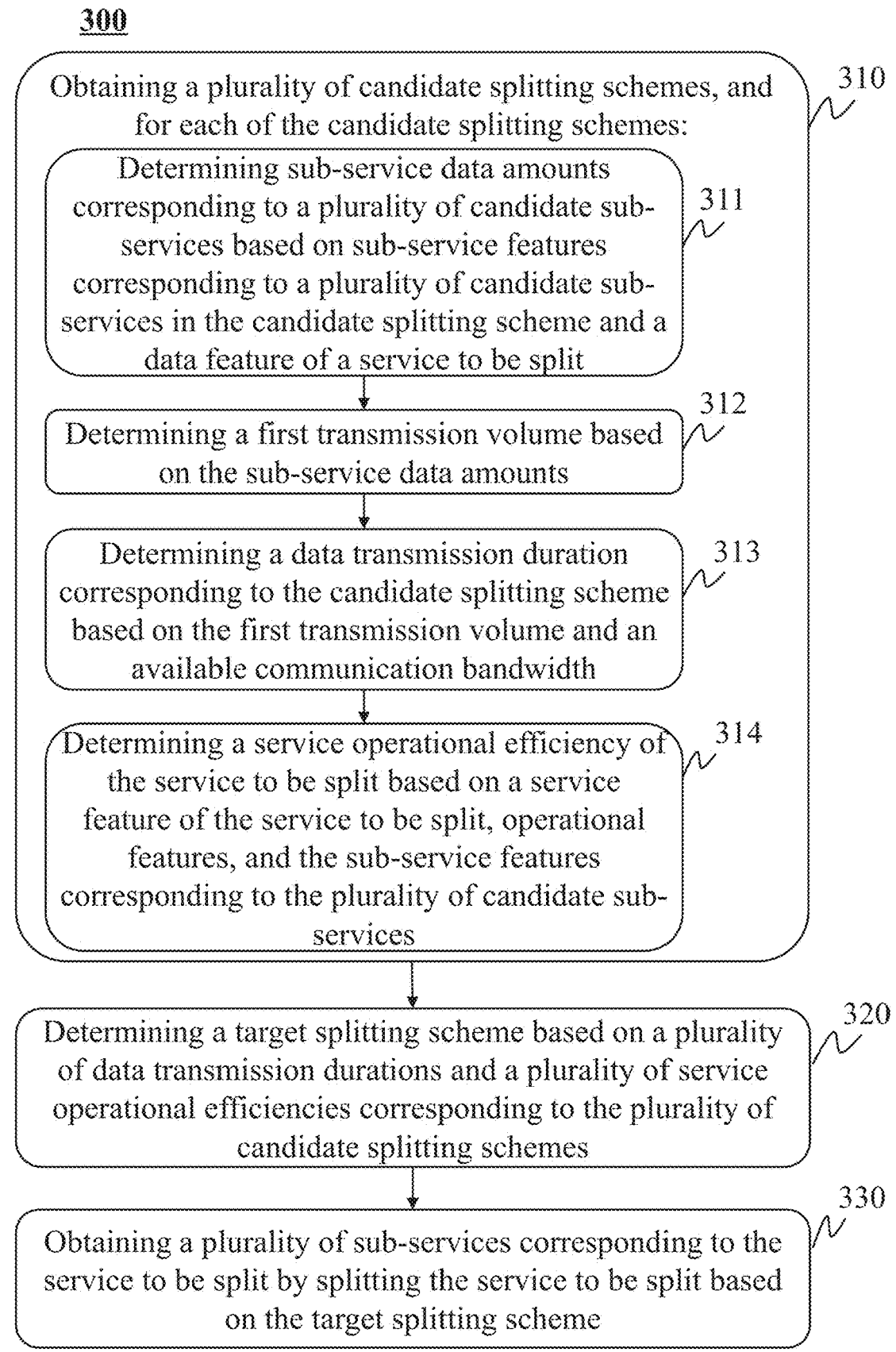
FIG. 3 is a flowchart of an exemplary process for splitting a service to be split according to some embodiments of the present disclosure.

FIG. 3 is a flowchart of an exemplary process for splitting a service to be split according to some embodiments of the present disclosure. As shown in FIG. 3, process 300 includes the following operations. In some embodiments, process 300 is implemented by a management platform (e.g., the management platform 110) of the system 100.

In some embodiments, for a service to be split among a plurality of services to be split, the management platform may perform operations 310-330 to split the service to be split to obtain a plurality of sub-services.

Operation 310, obtaining a plurality of candidate splitting schemes.

Operation 310 further includes operations 311 to 314. After obtaining the plurality of candidate splitting schemes, the management platform may execute operations 311 to 314 for a candidate splitting scheme among the plurality of candidate splitting schemes to determine a service operation efficiency and a data transmission duration corresponding to the candidate splitting scheme.

A candidate splitting scheme refers to a scheme for splitting the service to be split into a plurality of sub-services.

In some embodiments, the management platform obtains the plurality of candidate splitting schemes in various ways. For example, the management platform sets a plurality of sub-service counts, wherein each sub-service count corresponds to one candidate splitting scheme. Based on the sub-service counts, the management platform splits the service to be split using the manner for splitting the service to be split in operation 240, thereby obtaining the plurality of candidate splitting schemes.

In some embodiments, the management platform performs a plurality of splits on the service to be split through functional-item division and data-item division to obtain the plurality of candidate splitting schemes. The data-item division includes dividing data items of the service to be split based on historical invocation information and a data-item feature of the service to be split.

More descriptions regarding the functional items, the data items, and splitting the service to be split based on the functional items may be found in FIG. 2 and related descriptions thereof.

The historical invocation information refers to information related to historical data items invoked at historical time points. In some embodiments, the historical invocation information includes a plurality of historical data items invoked at a plurality of historical time points and historical data-item features of different historical data items. The historical data items refer to data items corresponding to historical services.

The data-item feature refers to data related to one or more data items. In some embodiments, the data-item feature includes a data-item source, a data-item time, a data-item type, etc., of each of one or more data items. The data-item source includes a workshop, a production line, or the like. The data-item time of a data item refers to a time when the data item is uploaded. The data-item type of a data item refers to a type of the functional item corresponding to the data item.

In some embodiments, the management platform may perform normalization or other processing on each piece of data in the data-item feature to represent each piece of data in a numerical form, or the like, thereby facilitating subsequent calculations.

In some embodiments, the management platform determines a correlation between two historical data items based on the historical invocation information and splits the data items of the service to be split based on a plurality of correlations and the historical invocation information.

The correlation refers to data measuring a degree of association between two historical data items. In some embodiments, the management platform determines a count of times two historical data items are simultaneously invoked based on the historical invocation information and designates the count as the correlation between the two historical data items.

In some embodiments, to divide the data items of the service to be split based on the plurality of correlations and the historical invocation information, the management platform is configured to perform the following operations:

S1: dividing a plurality of historical data items into a plurality of first groups based on the plurality of correlations and historical data-item features.

In some embodiments, the management platform traverses each historical data item, filters historical data items whose correlation with a currently traversed historical data item is greater than a correlation threshold, and assigns the historical data items and the currently traversed historical data item to a first group. The traversal process continues. If the currently traversed historical data item has already been assigned to a first group, the historical data items whose correlation with the currently traversed historical data item is greater than the correlation threshold are also assigned to the same first group. The traversal process continues until all historical data items have been traversed. The correlation threshold is set empirically.

For example, the management platform traverses historical data items a, b, c, d, and e. First, the management platform filters historical data item b, whose correlation with a is greater than the correlation threshold, and assigns historical data items a and b to a first group. Then, the management platform filters historical data item d, whose correlation with b is greater than the correlation threshold, and adds d to the first group containing b. Next, the management platform filters historical data item e, whose correlation with c is greater than the correlation threshold, and assigns c and e to a first group.

S2: determining a group feature of each of the plurality of first groups. The group feature of a first group refers to data that characterizes information related to the data items within the first group. In some embodiments, the management platform determines an average value of the historical data-item features of a plurality of historical data items in a first group, and designates the average value as the group feature of the first group.

S3: based on the historical data-item features and a plurality of group features of the plurality of first groups, assigning ungrouped historical data items from S1 into the plurality of first groups.

In some embodiments, for each ungrouped historical data item in S1, the management platform constructs a data feature vector based on the historical data-item feature of the historical data item, thereby constructing a plurality of group feature vectors based on the plurality of group features of the plurality of first groups. The management platform then determines a similarity between the data feature vector and each of the plurality of group feature vectors. A group feature vector with a highest similarity that exceeds a similarity threshold is selected, and the historical data item is assigned to the first group corresponding to the group feature vector with the highest similarity that exceeds the similarity threshold is selected. The similarity threshold is set empirically. The similarity is inversely correlated with a vector distance. The vector distance includes a Euclidean distance, or the like.

S4: based on the historical data-item features, assigning the ungrouped historical data items from S3 into a plurality of second groups.

In some embodiments, the management platform constructs clustering vectors based on the historical data-item features of the ungrouped historical data items in S3, performs clustering on the clustering vectors to form a plurality of clusters, and assigns the historical data items corresponding to the clustering vectors in each cluster to a second group. The management platform determines a group feature of each of the plurality of second groups using the same manner as in S2 for determining the group feature of the first group.

S5: designating the first groups and the second groups as target groups, and assigning the data items of the service to be split into different target groups based on the data-item features of the data items.

In some embodiments, for each of the data items of the service to be split, the management platform constructs a matching vector based on the data-item feature of the data item, determines a similarity between the matching vector and each of the plurality of group feature vectors, selects a group feature vector with a highest similarity, and assigns the data item to the target group corresponding to the group feature vector. This process is repeated until all data items of the service to be split have been assigned.

After the division is completed, the management platform retains the target groups containing data items of the service to be split, removes the historical data items from the retained target groups, and obtains a plurality of target groups consisting solely of the data items of the service to be split. Each of the obtained plurality of target groups is designated as a sub-service, and a plurality of sub-services collectively form a candidate splitting scheme.

In some embodiments, when the management platform performs splits on the service to be split based on the count of the plurality of sub-services—through functional-item division and data-item division—the data-item division may be conducted using the aforementioned manner, thereby generating the plurality of candidate splitting schemes.

By dividing the data items of the service to be split based on the historical invocation information and the data-item feature of the service to be split, it is ensured that the data items in the sub-services obtained by splitting the service to be split remain correlated, which enhances the efficiency of subsequent sub-service processing by the data sub-platforms when executing the candidate splitting scheme.

Operation 311: determining sub-service data volumes corresponding to a plurality of candidate sub-services based on sub-service features corresponding to the plurality of candidate sub-services in the candidate splitting scheme and a data feature of the service to be split.

A candidate sub-service refers to a sub-service obtained by splitting the service to be split according to the candidate splitting scheme. More descriptions regarding the sub-service features may be found in FIG. 2 and its related descriptions.

The data feature of the service to be split refers to data that characterizes information related to the service to be split. In some embodiments, the data feature of the service to be split includes: a runtime program data volume and a configuration file data volume of each functional item of the service to be split, a data volume of each to-be-processed data item of the service to be split, or the like.

The sub-service data volume of a candidate sub-service refers to the data volume corresponding to the candidate sub-service. In some embodiments, the sub-service data volume includes: a runtime program data volume and a configuration file data volume of each functional item of the sub-service, a data volume of each data item of the sub-service, or the like.

In some embodiments, for each of the plurality of candidate sub-services, the management platform determines an identical functional item based on the sub-service feature of the candidate sub-service, and includes the runtime program data volume and the configuration file data volume of the identical functional item into the sub-service data volume of the candidate sub-service. The management platform determines a ratio of a count of data items in the candidate sub-service to a count of to-be-processed data items in the identical functional item, multiplies the ratio by the data volume of the to-be-processed data items, and adds the result to the sub-service data volume of the candidate sub-service. The identical functional item refers to a functional item in the data feature of the service to be split that are the same as the corresponding functional item in the candidate sub-service.

Operation 312: determining a first transmission volume based on the sub-service data volumes.

The first transmission volume refers to a total data volume of the plurality of candidate sub-services transmitted.

In some embodiments, the management platform determines a sum of the sub-service data volumes of the plurality of candidate sub-services, and multiplies the sum by a transmission volume coefficient to obtain the first transmission volume. The transmission volume coefficient is related to a count of the plurality of candidate sub-services. For example, the transmission volume coefficient may $$\left(1 - \frac{1}{a}\right),$$

wherein a denotes the count of the plurality of candidate sub-services.

In some embodiments, the management platform obtains a plurality of candidate transmission schemes, determines second transmission volumes corresponding to the plurality of candidate transmission schemes based on the sub-service data volumes, and obtain the first transmission volume based on the second transmission volumes.

A candidate transmission scheme refers to a plan for transmitting a plurality of candidate sub-services to one or more second sub-platforms. In some embodiments, the candidate transmission scheme includes retaining a local service and transmitting other candidate sub-services to the one or more second sub-platforms. The local service refers to a service processed on the first sub-platform.

In some embodiments, for each of the plurality of candidate sub-services, the management platform designates a current candidate sub-service as the local service, and designates remaining sub-services as candidate sub-services to be transmitted to the one or more second sub-platforms, thereby obtaining a candidate transmission scheme. The management platform iteratively designates each of the candidate sub-services as the local service, and repeats the above process to generate the plurality of candidate transmission schemes.

The second transmission volume corresponding to a candidate transmission scheme refers to a total data volume of the plurality of candidate sub-services transmitted under the candidate transmission scheme.

In some embodiments, for each of the plurality of candidate transmission schemes, the management platform determines a sum of the sub-service data volumes of the candidate sub-sub-services transmitted to the second sub-platform in the candidate transmission scheme based on the sub-service data volumes, and takes the sum as the second transmission volume corresponding to the candidate transmission scheme.

In some embodiments, the management platform determines a weighted sum of the second transmission volumes corresponding to the plurality of candidate transmission schemes and takes the sum as the first transmission volume. Weights of different candidate transmission schemes are inversely correlated with a first sum value of the local service in the candidate transmission scheme. The larger the first sum value is, the greater the processing resource demand of the local service is, and the more inclined the local service is to be offloaded to the second sub-platform, thus the smaller the weight is. More descriptions of the first sum value may be found in FIG. 2 and its related description.

By considering a plurality of candidate transmission schemes, the determination of the first transmission volume takes into account the processing resource demands of different candidate sub-sub-services, thereby synthesizing the plurality of candidate transmission schemes to obtain the first transmission volume. This approach ensures that the determined first transmission volume more accurately reflects the actual data transmission volume under the candidate splitting scheme.

Operation 313: determining a data transmission duration corresponding to the candidate splitting scheme based on the first transmission volume and an available communication bandwidth.

The data transmission duration refers to a duration required to transmit the plurality of candidate sub-services under the candidate splitting scheme to the second sub-platform.

The available communication bandwidth refers to a bandwidth of a communication link that may be utilized when the first sub-platform transmits the candidate sub-services. In some embodiments, the management platform determines an average bandwidth of communication links between the first sub-platform and a plurality of second sub-platforms, and designates the average bandwidth as the available communication bandwidth.

In some embodiments, the data transmission duration is positively correlated with the first transmission volume and inversely correlated with the available communication bandwidth. For example, the management platform calculates the data transmission duration based on the first transmission volume and the available communication bandwidth using Equation (2):

$$F = \frac{m}{(a-1)*b} \quad (2)$$

In Equation (2), F denotes the data transmission duration, m denotes the first transmission volume, a denotes the count of candidate sub-services, and b denotes the available communication bandwidth Operation 314: determining a service operation efficiency corresponding to the candidate splitting scheme based on a service feature of the service to be split, the sub-service features corresponding to the plurality of candidate sub-services, and operational features.

More descriptions regarding the service feature and the operational features may be found in FIG. 2 and related descriptions thereof.

The service operation efficiency refers to an estimated processing efficiency of processing the service to be split after the service to be split is split based on the candidate splitting scheme. In some embodiments, the service operation efficiency is represented by a sum value of operation efficiencies of the plurality of candidate sub-services. The operation efficiency of a candidate sub-service is presented by an execution count of the candidate sub-service per unit time. The execution count increments by 1 after the completion of processing one data item of the sub-service In some embodiments, the management platform determines the processing resource demands for the plurality of candidate sub-service based on the service feature of the service to be split, and the sub-service features of the plurality of candidate sub-service. More descriptions regarding the determination of the processing resource demands may be found in FIG. 2 and related descriptions thereof.

In some embodiments, the management platform determines the service operation efficiency in various ways based on the processing resource demands and the operational features corresponding to the plurality of candidate sub-services. For example, for each of the candidate sub-services, the management platform queries a preset table for a reference operation efficiency corresponding to an average operational feature and the processing resource demand of the candidate sub-service based on the average operational feature and the processing resource demand of the candidate sub-service, and designates the average operational feature as the operation efficiency of the candidate sub-service. The management platform determines a sum of the operation efficiencies of the plurality of candidate sub-services as the service operation efficiency corresponding to the candidate splitting scheme. The average operational feature includes an average value of total CPU usage rates and an average value of total memory occupancy rates of a plurality of data sub-platforms.

In some embodiments, the preset table is constructed based on experimental data. The experimental data may be obtained through an experimental process including: under a given average operational feature, running a sub-service with a defined processing resource demand on a plurality of data sub-platforms to obtain a plurality of operation efficiencies, and then designating an average value of the operation efficiencies as the reference operation efficiency corresponding to the average operational feature and the processing resource demand.

In some embodiments, the management platform may determine the service operation efficiency using an efficiency prediction model based on the processing resource demands and the operational features corresponding to the plurality of candidate sub-services. More descriptions may be found in FIG. 4 and its related descriptions.

Operation 320: determining a target splitting scheme based on a plurality of data transmission durations and a plurality of service operation efficiencies corresponding to the plurality of candidate splitting schemes.

The target splitting scheme refers to the selected candidate splitting scheme for implementation.

In some embodiments, the management platform selects a candidate splitting scheme with a highest service operation efficiency from candidate splitting schemes with data transmission durations below a transmission time threshold as the target splitting scheme. The transmission time threshold is set empirically.

Operation 330: obtaining a plurality of sub-services corresponding to the service to be split by splitting the service to be split based on the target splitting scheme.

The management platform executes splitting procedures defined in the target splitting scheme, thereby splitting the service to be split into the plurality of sub-services.

By evaluating the plurality of candidate splitting schemes based on their data transmission durations and service operation efficiencies after splitting, an optimal scheme can be identified. This approach facilitates more appropriate splitting of the service to be split, preventing excessive computational pressure on the second sub-platform caused by oversized sub-services and balancing the computational load across data sub-platforms.

Figure 4:
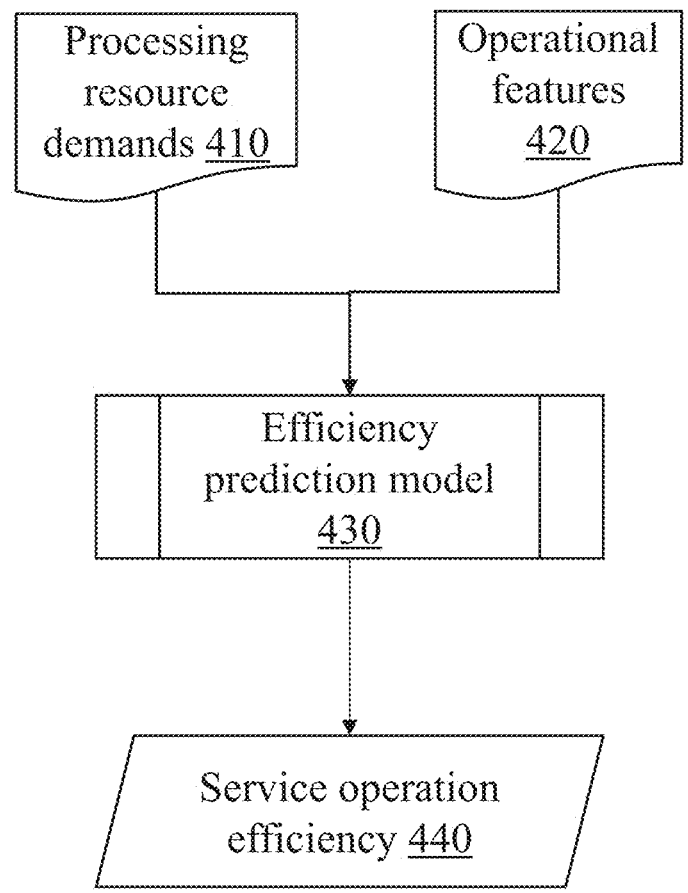
FIG. 4 is a schematic diagram of an exemplary efficiency prediction model according to some embodiments of the present disclosure.

FIG. 4 is a schematic diagram of an exemplary efficiency prediction model according to some embodiments of the present disclosure.

In some embodiments, a management platform may determine a service operation efficiency 440 through an efficiency prediction model 430 based on processing resource demands 410 and operational features 420 corresponding to a plurality of candidate sub-services.

More descriptions regarding the candidate sub-service, the processing resource demand, the operational feature, and the service operation efficiency may be found in FIGS. 2 and 3 and their related descriptions.

The efficiency prediction model refers to a model configured to determine the service operation efficiency. In some embodiments, the efficiency prediction model is a machine learning model, such as a Recurrent Neural Network (RNN) model, a Deep Neural Network (DNN) model, a custom model architecture, or the like, or any combination thereof.

In some embodiments, the management platform trains the efficiency prediction model using a gradient descent manner based on a training dataset. The training dataset includes a plurality of sets of training samples and labels corresponding to sets of training samples. Each set of training samples includes sample operational features and sample processing resource demands corresponding to a plurality of sample sub-services of a sample service to be split. The label of each set of training samples includes an actual service operation efficiency of the sample service to be split in the set of training samples.

In some embodiments, the training samples and the labels are obtained from historical data. For example, the management platform may designate a historical service to be split as the sample service to be split, randomly allocate the sample sub-services obtained from splitting the sample service to be split to a plurality of historical second sub-platforms a plurality of times, and determine an actual service operation efficiency after each random allocation. The management platform then designates an average value of the service operation efficiencies corresponding to the plurality of random allocations as the label. More descriptions regarding the determination of the service operation efficiency may be found in FIG. 3 and its related descriptions.

In some embodiments, the efficiency prediction model is trained as follows: a plurality of labeled training samples are input into an initial efficiency prediction model, a loss function is constructed based on the labels and prediction results of the initial model, and the initial model is iteratively updated based on the loss function. The training is completed when the loss function meets a preset condition. The preset condition may include the loss function converging, a count of iterations reaching a threshold, or the like.

By processing the operational features and the processing resource demands of a plurality of candidate sub-services through the efficiency prediction model, a self-learning capability of machine learning models can be leveraged to identify patterns from large datasets and establish a relationship between the operational features, the processing resource demands of the plurality of candidate sub-services, and the service operation efficiency, thereby improving the accuracy and efficiency of determining the service operation efficiency.

FIG. 5 is a flowchart of an exemplary process for determining a service adjustment parameter according to some embodiments of the present disclosure. As shown in FIG. 5, process 500 includes the following operations. In some embodiments, process 500 may be performed by a management platform (e.g., the management platform 110).

Operation 510: determining a plurality of candidate allocation relationships based on processing resource demands and operational features, and determining predicted operational information corresponding to the plurality of candidate allocation relationships.

A candidate allocation relationship refers to a distribution relationship between a plurality of sub-services and a plurality of sub-platforms. In some embodiments, the candidate allocation relationship includes allocation results of the plurality of sub-services. More descriptions regarding the allocation results, the processing resource demands, and the operational features may be found in FIG. 2 and the related descriptions.

In some embodiments, the management platform determines the plurality of candidate allocation relationships based on the processing resource demands and the operational features. For example, the management platform randomly allocates the plurality of sub-services to a plurality of second sub-platforms a plurality of times to establish the candidate allocation relationships. During the random allocation, a sum of CPU usage rates of the second sub-platforms does not exceed a CPU allocation threshold. More descriptions regarding the CPU allocation threshold may be found in FIG. 2 and its related descriptions.

The predicted operational information refers to future operational data of the plurality of second sub-platforms under a given allocation relationship. In some embodiments, the predicted operational information includes an estimated total CPU usage rate and an estimated total memory occupancy rate of each of the plurality of second sub-platforms.

In some embodiments, the management platform determines the predicted operational information based on the processing resource demands corresponding to the plurality of sub-services determined in operation 250 and the operational features of the plurality of second sub-platforms in the candidate allocation relationship. For example, the management platform determines a total CPU usage rate of a plurality of sub-services allocated to a second sub-platform, determines a sum of the total CPU usage rate of the plurality of sub-services and the total CPU usage rate in the operational feature of the second sub-platform, and designates the sum as the estimated total CPU usage rate of the second sub-platform. The estimated total memory occupancy rate may be determined in a similar manner.

Operation 520: determining a target allocation relationship based on the predicted operational information.

The target allocation relationship refers to the selected candidate allocation relationship for implementation.

In some embodiments, the management platform determines a third sum value corresponding to each candidate allocation relationship based on the predicted operational information, and selects a candidate allocation relationship with a smallest third sum value as the target allocation relationship. The third sum value is a sum of variances of a plurality of estimated total CPU usage rates and variances of a plurality of estimated total memory occupancy rates.

Operation 530: determining the service adjustment parameter based on the target allocation relationship.

In some embodiments, the management platform determines the allocation result of each of the plurality of sub-services in the target allocation relationship as an allocation result of the sub-service in the service adjustment parameter.

By evaluating the service processing efficiencies of a plurality of allocation relationships, this approach facilitates identifying an optimal allocation relationship, thereby effectively improving subsequent service processing efficiency.

It should be noted that the foregoing descriptions of processes 200, 300, and 400 are intended to be exemplary and illustrative only and do not limit the scope of application of the present disclosure. For a person skilled in the art, various corrections and changes may be made to the processes 200, 300, and 400 under the guidance of the present disclosure. However, these corrections and changes remain within the scope of the present disclosure.

One or more embodiments of the present disclosure provide a non-transitory computer-readable storage medium storing computer instructions. When reading the computer instructions in the storage medium, a computer implements the method for computation scheduling based on an Industrial Internet of Things (IIoT) data center described in one or more embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be noted that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for computation scheduling based on an Industrial Internet of Things (IIoT) data center, comprising a management platform, the IIoT data center, and a plurality of data sub-platforms, wherein the management platform, the IIoT data center, and the plurality of data sub-platforms are in communication with each other, and the management platform is configured to:
    obtain operational features of the plurality of data sub-platforms;
    determine a first sub-platform and one or more second sub-platforms among the plurality of data sub-platforms based on the operational features;
    determine at least one service to be split based on the operational features and service features corresponding to a plurality of services of the first sub-platform;
    split the at least one service to be split into a plurality of sub-services based on at least one service feature corresponding to the at least one service to be split;
    determine processing resource demands corresponding to the plurality of sub-services based on the at least one service feature corresponding to the at least one service to be split, the operational features, and sub-service features corresponding to the plurality of sub-services;
    determine a service adjustment parameter based on the processing resource demands and the operational features; and
    generate a service adjustment instruction based on the service adjustment parameter and send the service adjustment instruction to the first sub-platform and the one or more second sub-platforms;
    use the first sub-platform to:
        obtain a plurality of data packages by performing data processing on the plurality of sub-services based on the service adjustment instruction; and
        send the plurality of data packages to the second sub-platform; and
    use the one or more second sub-platforms to:
        receive the plurality of data packages;
        determine data volumes of the plurality of data packages by parsing the plurality of data packages;
        obtain parsed data by allocating corresponding parsing memory for the plurality of data packages based on the data volumes and parsing the plurality of data packages;
        establish processes corresponding to the plurality of sub-services based on the parsed data; and
        determine processing resources for executing the processes based on the service adjustment instruction.

2. The system of claim 1, wherein the management platform is further configured to:
    for a service to be split among the at least one service to be split:
        obtain a plurality of candidate splitting schemes;
        determine a target splitting scheme based on a plurality of data transmission durations and a plurality of service operation efficiencies corresponding to the plurality of candidate splitting schemes; and
        obtain a plurality of sub-services corresponding to the service to be split by splitting the service to be split based on the target splitting scheme.

3. The system of claim 2, wherein the management platform is further configured to:
    obtain the plurality of candidate splitting schemes by performing a plurality of splits on the service to be split through functional-item division and data-item division.

4. The system of claim 1, wherein the management platform is further configured to:
    determine a plurality of candidate allocation relationships based on the processing resource demands and the operational features, and determine predicted operational information corresponding to the plurality of candidate allocation relationships;
    determine a target allocation relationship based on the predicted operational information; and
    determine the service adjustment parameter based on the target allocation relationship.

5. A method for computation scheduling based on an Industrial Internet of Things (IIoT) data center, the method being executed by a management platform and method comprising:
    obtaining operational features of a plurality of data sub-platforms;
    determining a first sub-platform and one or more second sub-platforms among the plurality of data sub-platforms based on the operational features;
    determining at least one service to be split based on the operational features and service features corresponding to a plurality of services of the first sub-platform
    splitting the at least one service to be split into a plurality of sub-services based on at least one service feature corresponding to the at least one service to be split;
    determining processing resource demands corresponding to the plurality of sub-services based on the at least one service feature corresponding to the at least one service to be split, the operational features, and sub-service features corresponding to the plurality of sub-services;
    determining a service adjustment parameter based on the processing resource demands and the operational features;
    generating a service adjustment instruction based on the service adjustment parameter and sending the service adjustment instruction to the first sub-platform and the one or more second sub-platforms;

using the first sub-platform to:
obtain a plurality of data packages by performing data processing on the plurality of sub-services based on the service adjustment instruction; and
send the plurality of data packages to the second sub-platform; and using the one or more second sub-platforms to:
receive the plurality of data packages;
determine data volumes of the plurality of data packages by parsing the plurality of data packages;
obtain parsed data by allocating corresponding parsing memory for the plurality of data packages based on the data volumes and parsing the plurality of data packages;
establish processes corresponding to the plurality of sub-services based on the parsed data; and
determine processing resources for executing the processes based on the service adjustment instruction.

6. The method of claim 5, wherein the splitting the at least one service to be split into a plurality of sub-services based on at least one service feature corresponding to the at least one service to be split includes:
for a service to be split among the at least one service to be split:
obtaining a plurality of candidate splitting schemes;
determining a target splitting scheme based on a plurality of data transmission durations and a plurality of service operation efficiencies corresponding to the plurality of candidate splitting schemes; and
obtaining a plurality of sub-services corresponding to the service to be split by splitting the service to be split based on the target splitting scheme.

7. The method of claim 6, wherein the obtaining a plurality of candidate splitting schemes includes:
obtaining the plurality of candidate splitting schemes by performing a plurality of splits on the service to be split through functional-item division and data-item division.

8. The method of claim 5, wherein the determining a service adjustment parameter based on the processing resource demands and the operational features includes:
determining a plurality of candidate allocation relationships based on the processing resource demands and the operational features, and determining predicted operational information corresponding to the plurality of candidate allocation relationships;
determining a target allocation relationship based on the predicted operational information; and
determining the service adjustment parameter based on the target allocation relationship.

9. A non-transitory computer-readable storage medium storing one or more sets of computer instructions, wherein when reading the one or more sets of computer instructions in the storage medium, a computer implements a method for computation scheduling based on an Industrial Internet of Things (IIoT) data center, the method is executed by a management platform, and method comprises:
obtaining operational features of a plurality of data sub-platforms;
determining a first sub-platform and one or more second sub-platforms among the plurality of data sub-platforms based on the operational features;
determining at least one service to be split based on the operational features and service features corresponding to a plurality of services of the first sub-platform;
splitting the at least one service to be split into a plurality of sub-services based on at least one service feature corresponding to the at least one service to be split;
determining processing resource demands corresponding to the plurality of sub-services based on the at least one service feature corresponding to the at least one service to be split, the operational features, and sub-service features corresponding to the plurality of sub-services;
determining a service adjustment parameter based on the processing resource demands and the operational features;
generating a service adjustment instruction based on the service adjustment parameter and sending the service adjustment instruction to the first sub-platform and the one or more second sub-platforms;
using the first sub-platform to:
obtain a plurality of data packages by performing data processing on the plurality of sub-services based on the service adjustment instruction; and
send the plurality of data packages to the second sub-platform; and
using the one or more second sub-platforms to:
receive the plurality of data packages;
determine data volumes of the plurality of data packages by parsing the plurality of data packages;
obtain parsed data by allocating corresponding parsing memory for the plurality of data packages based on the data volumes and parsing the plurality of data packages;
establish processes corresponding to the plurality of sub-services based on the parsed data; and
determine processing resources for executing the processes based on the service adjustment instruction.

* * * * *